United States Patent
Shirvani et al.

(10) Patent No.: US 11,924,049 B2
(45) Date of Patent: *Mar. 5, 2024

(54) NETWORK PERFORMANCE METRICS ANOMALY DETECTION

(71) Applicant: Accedian Networks Inc., Saint-Laurent (CA)

(72) Inventors: Abdolreza Shirvani, Ottawa (CA); Elizabeth Keddy, Ottawa (CA); Glenda Ann Leonard, Carp (CA); Christopher Daniel Fridgen, Kanata (CA)

(73) Assignee: ACCEDIAN NETWORKS INC., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,097

(22) Filed: Nov. 25, 2022

(65) Prior Publication Data

US 2023/0092829 A1  Mar. 23, 2023

Related U.S. Application Data

(63) Continuation of application No. 17/384,195, filed on Jul. 23, 2021, now Pat. No. 11,539,573, which is a continuation of application No. 15/929,956, filed on May 29, 2020, now Pat. No. 11,108,621.

(51) Int. Cl.
| | |
|---|---|
| *H04L 41/142* | (2022.01) |
| *G06F 18/22* | (2023.01) |
| *H04L 9/40* | (2022.01) |
| *H04L 41/0631* | (2022.01) |

(52) U.S. Cl.
CPC ............ *H04L 41/142* (2013.01); *G06F 18/22* (2023.01); *H04L 41/064* (2013.01); *H04L 41/065* (2013.01); *H04L 63/1425* (2013.01)

(58) Field of Classification Search
CPC ... H04L 41/142; H04L 41/064; H04L 41/065; H04L 63/1425; H04L 43/0817; H04L 43/0829; H04L 43/0852; G06F 18/22
See application file for complete search history.

(56) References Cited

U.S. PATENT DOCUMENTS

| | | | |
|---|---|---|---|
| 10,045,218 B1* | 8/2018 | Stapleton | G06N 5/01 |
| 2004/0064290 A1* | 4/2004 | Cabral | G06F 11/348 |
| | | | 702/182 |
| 2021/0021624 A1* | 1/2021 | Peng | H04L 63/1425 |
| 2021/0344569 A1* | 11/2021 | Su | H04L 41/142 |

* cited by examiner

*Primary Examiner* — Brian J. Gillis
*Assistant Examiner* — Chhian (Amy) Ling

(57) ABSTRACT

A method for detecting anomalies in one or more network performance metrics stream for one or more monitored object comprising using a discrete window on the stream to extract a motif from said stream for a first of said network performance metric for a first of said monitored object. Maintaining an abnormal and a normal cluster center of historical time series for said first network performance metric for said first monitored object. Classifying said motif based on a distance between said new time series and said abnormal and said normal cluster center. Determining whether an anomaly for said motif occurred based on said distance and a predetermined decision boundary.

16 Claims, 6 Drawing Sheets

NETWORK PERFORMANCE METRICS ANOMALY DETECTION

CROSS-REFERENCE TO RELATED APPLICATIONS

This application is a continuation of U.S. patent application Ser. No. 17/384,195, filed Jul. 23, 2021, now U.S. Pat. No. 11,539,573, which is a continuation of and claims priority to U.S. patent application Ser. No. 15/929,956, filed May 29, 2020, now U.S. Pat. No. 11,108,621, all of which are hereby incorporated by reference herein in their entirety.

BACKGROUND

New generation networks (e.g. 5G) are facing higher performance requirements where more quality and reliability assurance is necessary. In high speed networks, performance problems occur very fast and need to be detected rapidly in order to prevent degradation of the overall network performance. Performance anomaly detection has typically been a manual process which makes it difficult to react in real-time to performance problems.

There is a need for performance measurements to be ultra granular and accurate, with automated anomaly detection.

BRIEF SUMMARY

A method is disclosed for detecting anomalies in one or more network performance metrics stream for one or more monitored object comprising using a discrete window on the stream to extract a motif from said stream for a first of said network performance metric for a first of said monitored object; maintaining an abnormal and a normal cluster center of historical time series for said first network performance metric for said first monitored object; classifying said motif based on a distance between said new time series and said abnormal and said normal cluster center; determining whether an anomaly for said motif occurred based on said distance and a predetermined decision boundary.

An anomaly detection system is disclosed for detecting anomalies comprising a monitored object in a network; a measurement system to collect a plurality of performance data on said monitored object and transmitting said performance data as a new time series to said anomaly detection system; a table maintaining an abnormal and a normal cluster center of historical time series for said performance metric for said monitored object; said anomaly detection system using a discrete window on the new time series to extract a motif; classifying said motif based on a distance between said motif and said abnormal and said normal cluster center; said anomaly detection system determining whether an anomaly for said performance metric for said monitored object occurred based on said distance and a predetermined decision boundary.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Figure 1:
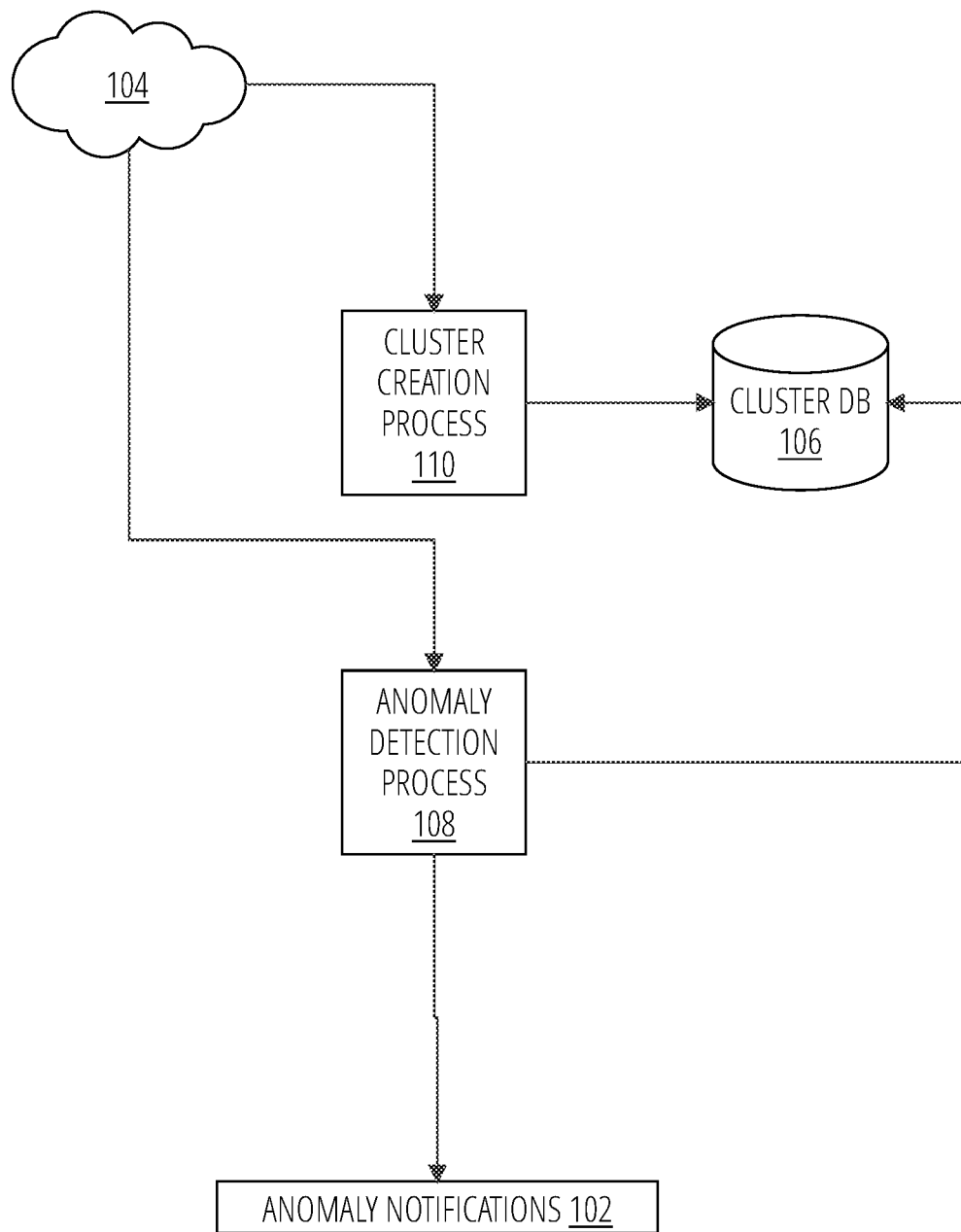
FIG. 1 illustrates a system to detect anomalies in accordance with one embodiment.

In one embodiment, as per FIG. 1, the system comprises a network 104 streaming time series of performance measures to a cluster creation process 110 to initialize the system, then to an anomaly detection process 108 that monitors the performance measures continuously to detect anomalies and raise alarms 102. The cluster creation process 110 and the anomaly detection process 108 may be executed by the same processor. In another embodiment, they are executed on a different processor but sharing a database 106. The determination of the anomaly is done using unsupervised learning.

A time series of performance measures applies to each monitored object located in the network (for example, but not limited to network node, path, link). The time series of performance measures is applicable to one direction (upstream or downstream). The time series of performance measures relates to one performance metric, for example, but not limited to, loss, delay and/or delay variation.

To initialize the system, historical time series of performance measures are analyzed to find repeating patterns (referred herein as motifs) in the time series using a cluster creation process 110 executed on a processor or processing engine. The process first determines whether the time series repeats itself based on hour of day, hour of week etc. This can be a manual or automated process and it is performed when the system is installed or when a new feature (e.g. a new monitored object or a new performance measure) is added. For example, divide the day into 24 hours (e.g. 1-2 pm, 2-3 pm . . . ) in order to identify the expected pattern for every hour of the day, then each day of the week is handled separately. In another network, the day may be divided in 24 hours with Monday-Friday handled together separate from the Saturday-Sunday.

In a preferred embodiment, a discrete time window is used. However other types of windowing mechanisms applied on the time series may be applicable. This step determines a frequency and a discrete window size to be used for the initial clustering 110 and the anomaly detection process 108. The cluster creation process 110 also uses the historical performance measures to create one or more cluster tables and store them in a database 106 representing historical performance data in forms of cluster centers as described below.

Figure 2:
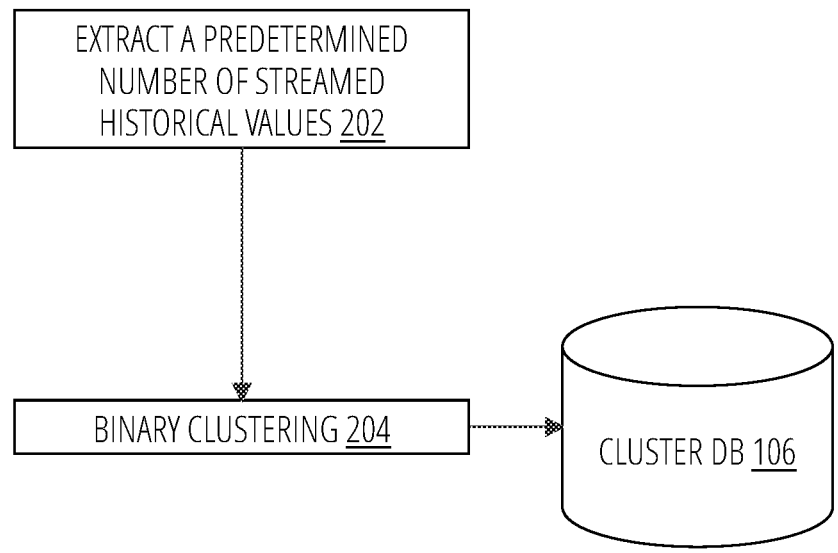
FIG. 2 illustrates the initial system set up in accordance with one embodiment.

FIG. 2 depicts the cluster creation process 110 applied to the historical time series 202 to define baseline cluster centers 204.

The historical data is extracted based on the predetermined frequency and window size 202. For example, a window of 1 hour, would create a time series of 60 1-minute measurements for each performance metric for each monitored object in each direction. Each extracted time series can be referred to as a motif. When a new time series is received, data cleaning, as known in the art, is performed to remove data that is corrupted.

Binary clustering 204 is performed on all related motifs (e.g. same performance measure, same monitored object, same direction, same time of day, same day of the week). Binary clustering divides the motifs into two clusters, the cluster with the most members is determined to be the normal cluster, the other one is the abnormal cluster. The majority voting scheme is used in conjunction with clustering to determine the normal cluster (expected motif). If majority cannot be achieved, we can increase the number of clusters to obtain the majority.

If the binary clustering leads to equal-sized clusters, the motifs are divided in 3 clusters and the cluster with the most members is determined to be the normal cluster. K-means or any compatible clustering algorithm in the art can be used considering a proper distance measure. The normal and abnormal cluster centers are determined as well as one or more decision boundaries which are the furthest members from the cluster center. In one embodiment, the furthest cluster member is used as the pessimistic decision boundary.

Figure 3:
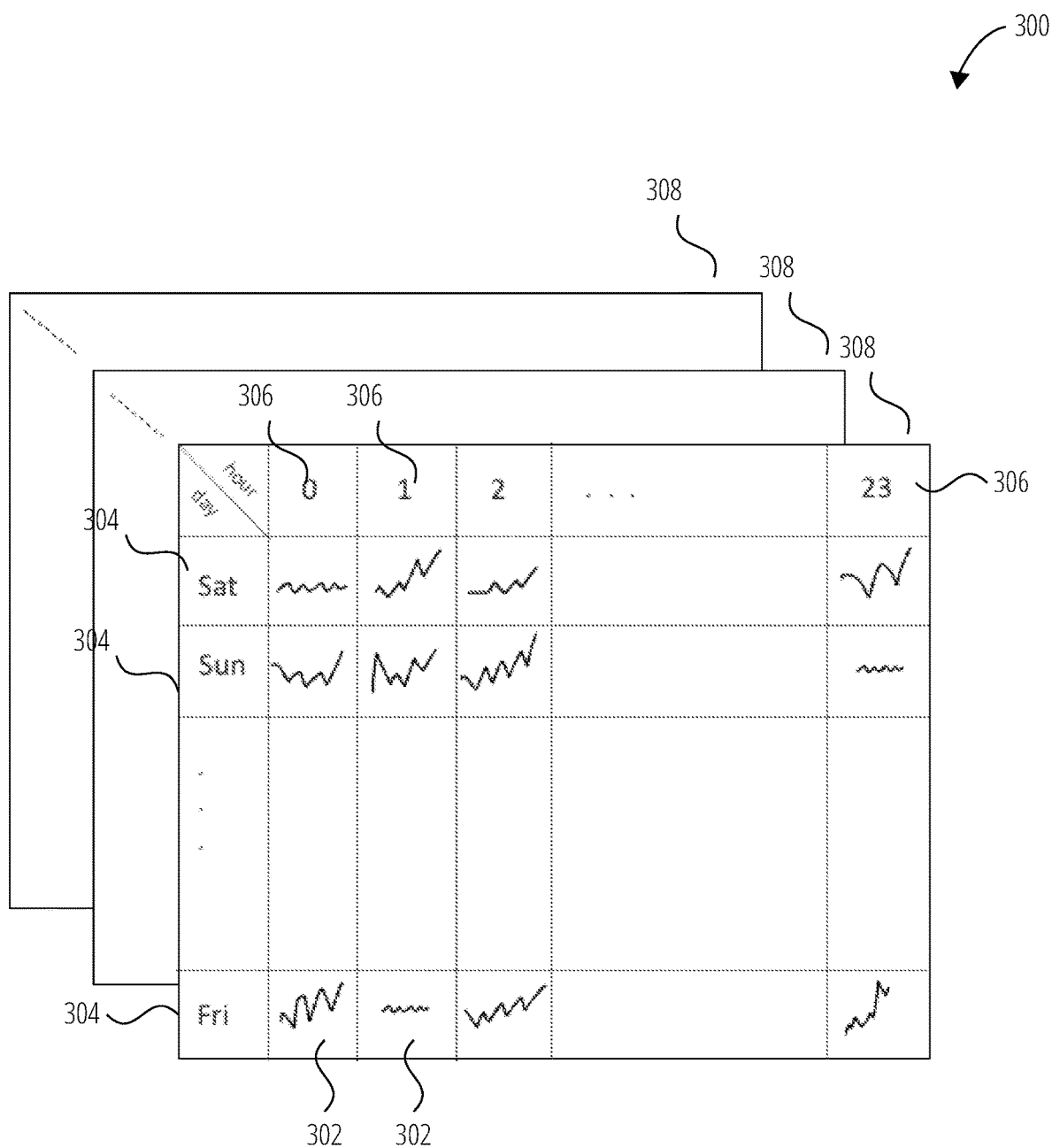
FIG. 3 illustrates motif tables in accordance with one embodiment.

As per FIG. 3, the motifs are stored in a table. In this example, each motif relating to the same performance measure, same monitored object, same direction 302 for each hour 306 of each day 304 and a table is stored for each week 308 of the year.

Figure 4:
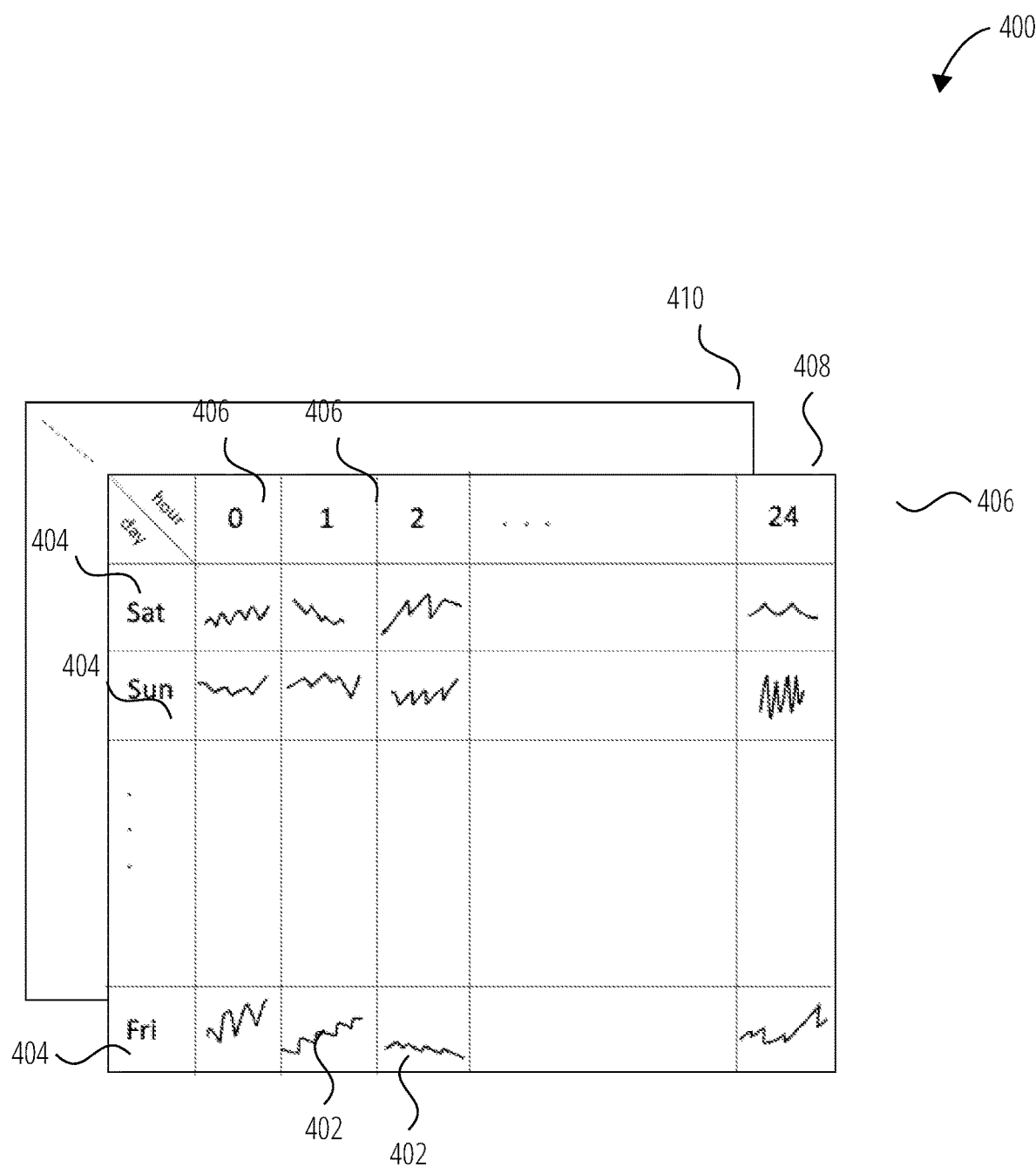
FIG. 4 illustrates cluster center tables in accordance with one embodiment.

As per FIG. 4 Another table is used to keep the cluster centers 402 for the normal 408 and abnormal clusters 410 for each performance measure for each monitored object in each direction for each hour of each day. When monitoring packet loss for two monitored objects in the upstream direction, the system maintains a weekly table of the motifs, and two normal cluster center tables and two abnormal cluster center tables.

Figure 5:
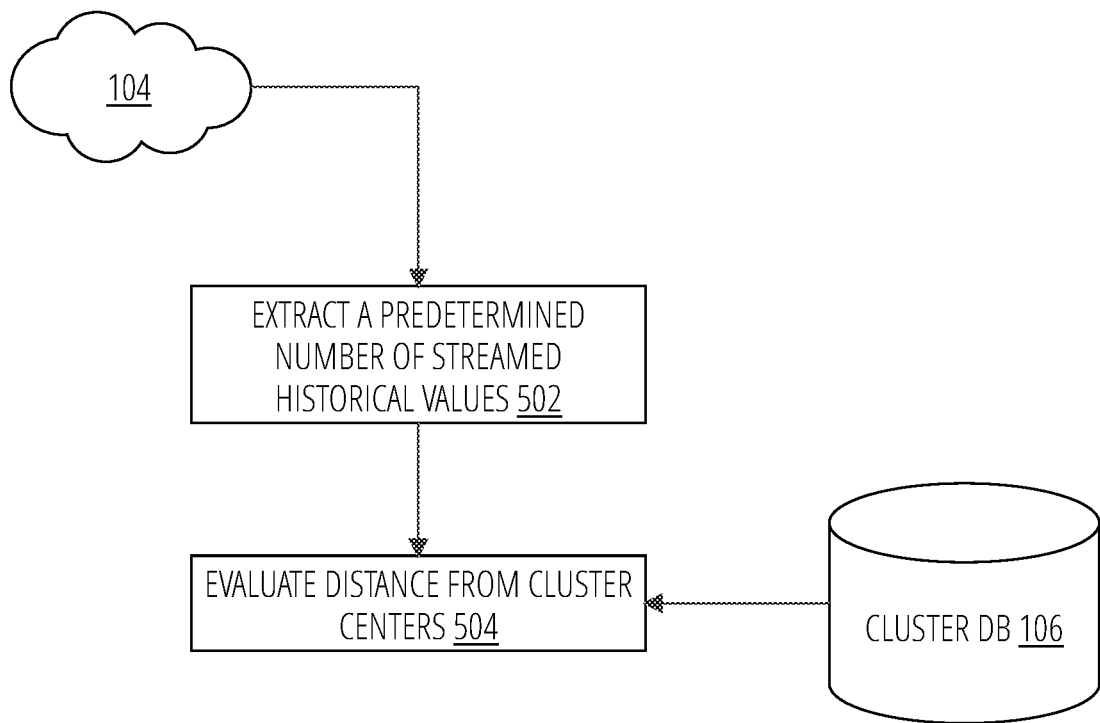
FIG. 5 illustrates the anomaly detection process in accordance with one embodiment.

FIG. 5 depicts the anomaly detection process 108. New time series for a given performance measure/monitored object/direction are extracted 502 based on the predetermined frequency and window size 202. The new motif of the extracted time series is cleaned, and it is classified by comparing its distance from normal and abnormal cluster centers 504 to the abnormal 410 and normal 408 cluster centers from the related tables 406 for that time of day and day of the week. If the motif is tagged to fall in the abnormal cluster based on the decision boundaries, then an anomaly is detected. In one embodiment, the distance is computed using euclidean distance, but any other technique to compute distance known in the art can be used.

Figure 6:
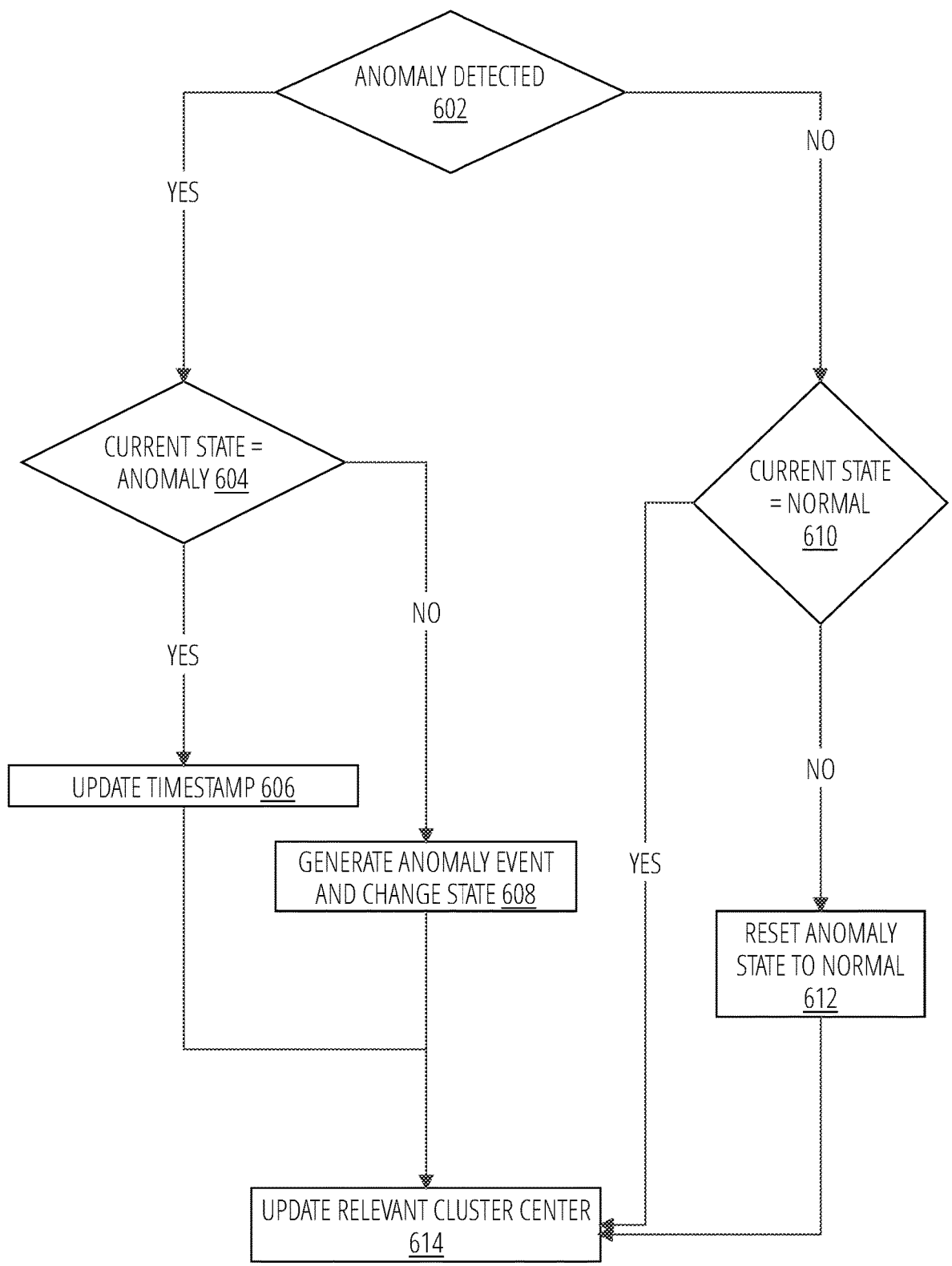
FIG. 6 illustrates the anomaly notification process in accordance with one embodiment.

FIG. 6 depicts a process followed when the motif has been tagged as abnormal or normal 602. When an anomaly is detected 602, if the monitored object is already in a state of anomaly 604 for that metric for the monitored object for that direction, a timestamp is updated to indicate the anomaly is persisting 606. Otherwise an anomaly event is generated 608 and the status of the monitored object is updated for that performance metric in that direction which triggers an anomaly notification 102. When an anomaly is not detected 602, if the state of this metric for the monitored object for that direction is abnormal 610, the anomaly status is reset to normal 612.

When the anomaly is handled, the motif is added to the historical data and the cluster centers (normal or abnormal) are recomputed with the new data 614.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random-access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (e.g., a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for detecting anomalies in one or more time series relating to one or more performance measures for one or more monitored objects in one or more networks comprising:
    selecting, by a processor, a discrete window on one of said one or more time series to extract a first motif for a first performance measure of said one or more performance measures for a first monitored object of said one or more monitored objects;
    maintaining, by the processor, an abnormal cluster center and a normal cluster center, from a binary clustering of one or more historical time series for said first performance measure for said first monitored object;
    classifying, by the processor, said first motif based on a distance between said first motif and said abnormal cluster center and said normal cluster center; and
    determining, by the processor, whether an anomaly for said first performance measure for said first monitored object occurred based on said distance and a predetermined decision boundary.

2. The method of claim 1 wherein said distance is computed, by the processor, using a euclidean distance algorithm.

3. The method of claim 1 wherein a cluster member furthest from the normal cluster center or the abnormal cluster center is used as said predetermined decision boundary.

4. The method of claim 1 further comprising sending, by the processor, an anomaly notification to a user that the anomaly has occurred.

5. The method of claim 1 wherein said first monitored object is selected from the group consisting of a network node, a path, and a link.

6. The method of claim 1 wherein said one or more time series captures performance measures for an upstream direction.

7. The method of claim 1 wherein said one or more time series captures performance measures for a downstream direction.

8. The method of claim 1 where the one or more time series of the one or more performance measures relates to a performance metric selected from the group consisting of loss, delay and delay variation.

9. An network anomaly detection system for detecting performance anomalies comprising:
    a measurement system configured to collect a plurality of time series of performance measures on one or more monitored objects in a network, to create a new time series;
    a processor; and
    a non-volatile memory storing instructions that, when executed by the processor, configure the network anomaly detection system to:
    maintain an abnormal cluster center and a normal cluster center from a binary clustering of historical time series for a performance measure for a monitored object of the one or more monitored objects;
    extract a motif using a discrete window on the new time series;
    classify said motif based on a distance between said motif and said abnormal cluster center and said normal cluster center; and
    determine an anomaly for said performance measure for said monitored object occurred based on said distance and a predetermined decision boundary.

10. The system of claim 9 wherein said distance is computed using a euclidean distance algorithm.

11. The system of claim 9 wherein a furthest cluster member is used as said predetermined decision boundary.

12. The system of claim 9, wherein the instructions that, when executed by the processor, further configure the network anomaly detection system to: send a notification to a user that said anomaly has occurred.

13. The system of claim 9 wherein said monitored object is selected from the group consisting of a network node, a path, and a link.

14. The system of claim 9 wherein said plurality of time series captures performance measures for an upstream direction.

15. The system of claim 9 wherein said plurality of time series captures performance measures for a downstream direction.

16. The system of claim 9 where the plurality of time series of performance measures relates to a performance metric selected from the group consisting of loss, delay and delay variation.

\* \* \* \* \*